United States Patent

Motz et al.

[15] 3,636,744
[45] Jan. 25, 1972

[54] INTERNAL GEAR ROLLING MACHINE

[72] Inventors: Carl H. Motz, Harper Woods; Richard W. Tersch, Grosse Pte. Woods; Arthur B. Bassoff, Oak Park, all of Mich.

[73] Assignee: Lear Siegler, Inc., Santa Monica, Mich.

[22] Filed: May 18, 1970

[21] Appl. No.: 38,455

[52] U.S. Cl. .................................... 72/91, 29/159.2, 72/103
[51] Int. Cl. ............................................................. B21h 5/02
[58] Field of Search ............... 72/82, 91, 102, 107, 108, 109, 72/110, 111, 124; 29/159.2

[56] References Cited

UNITED STATES PATENTS

Re.26,594  5/1969   Marcovitch et al. .................. 72/91
3,353,392  11/1967  Anthony et al. ...................... 72/110

*Primary Examiner*—Lowell A. Larson
*Attorney*—Whittemore, Hulbert & Belknap

[57] ABSTRACT

A machine for rolling the teeth of an internal gear comprising power means for moving a gearlike die radially of an internal gear to apply metal deforming pressure to its teeth.

10 Claims, 6 Drawing Figures

INVENTORS
CARL H. MOTZ
RICHARD W. TERSCH
BY ARTHUR B. BASSOFF
*Whittemore, Hulbert
& Belknap* ATTORNEYS

PATENTED JAN 25 1972

INVENTORS
CARL H. MOTZ
BY RICHARD W. TERSCH
ARTHUR B. BASSOFF

*Whittemore, Hulbert*
*& Belknap*
ATTORNEYS

INTERNAL GEAR ROLLING MACHINE

BRIEF SUMMARY OF INVENTION

The present invention relates to a machine designed for the application of relatively high metal displacing pressure between the teeth of a gearlike rolling die and the teeth of an internal gear.

In one embodiment of the invention the gear is loaded manually into a supporting fixture which is then elevated to working position in which the gear surrounds a gearlike die. The die is thereafter moved radially while being driven in rotation and applies burnishing, metal displacing pressure to the teeth of the gear.

In a further embodiment of the invention, means are provided for effecting automatic loading and unloading of the machine.

DETAILED DESCRIPTION

Figure 1:
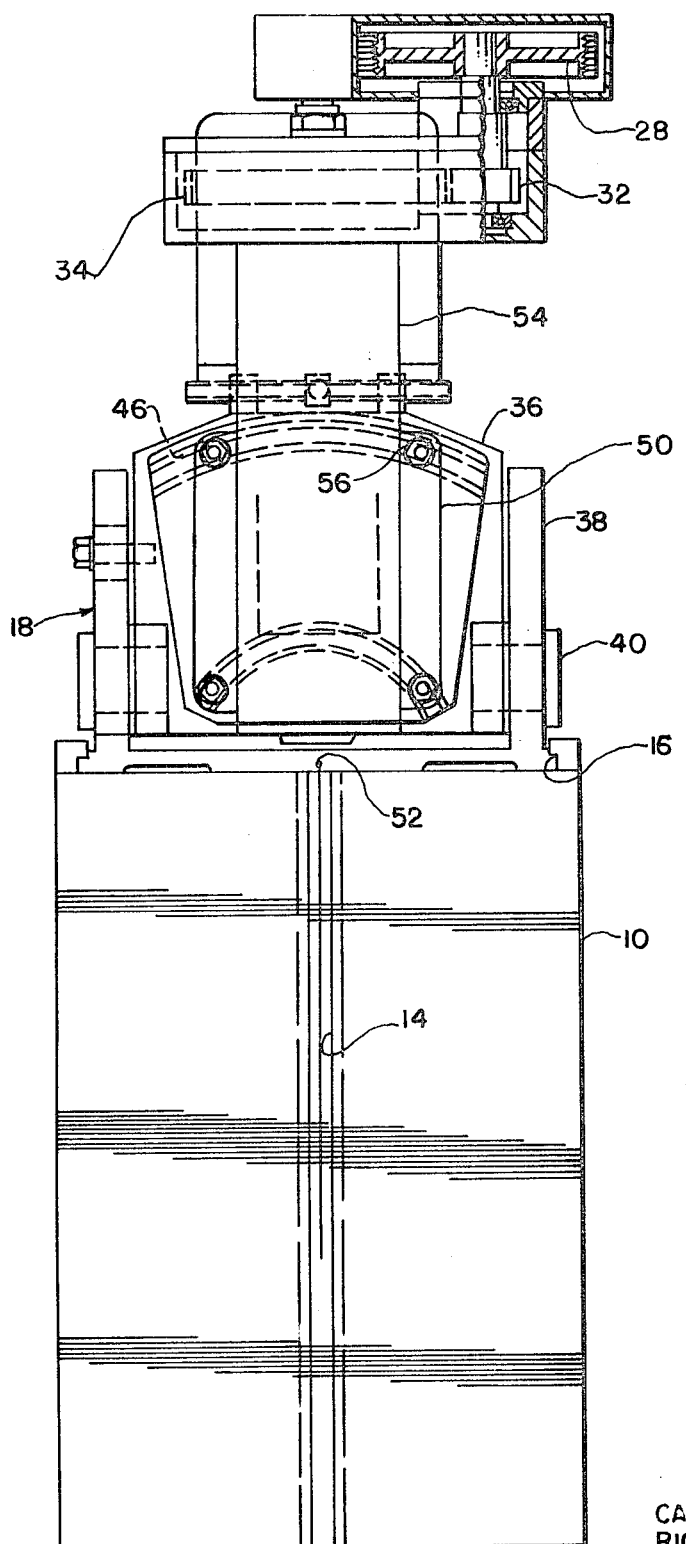
FIG. 1 is a front elevation of the gear rolling machine of the present invention, with parts in section.

Referring first to FIGS. 1-4, the machine comprises a base 10 on which a work holding platform 12 is mounted for vertical adjustment in ways indicated at 14, FIG. 1. Mounted in ways indicated generally at 16 in FIG. 1 is a tool slide 18 which carries a tool or die 20 in the form of a hardened steel gear, the die being driven in rotation by a rigid tubular drive shaft 22 driven from a motor 24 through sheaves 26 and 28 and belting indicated at 30. The sheave 28 drives the shaft 22 through gearing including a pinion 32 and a gear 34.

Means are provided for effecting angular adjustment of the die 20 and this means comprises a tool supporting block 36 which is pivoted to vertical side plates 38 by pivot pins indicated at 40. The block 36 is angularly adjustable about the pivot support relative to the slide 18 and for this purpose the plates or one of them is provided with arcuate slots 42 concentric with the pivot axis of the pivot support 40, and clamping bolts or screws 44 extend through the slot to clamp the block in adjusted position.

At its forward end the block is provided with arcuate ways 46 to which a mounting plate 50 is connected for angular adjustment about a horizontal axis located at the point 52 which indicates a line passing through the zone of mesh of the die 20 and a work gear. The plate 50 carries a motor through a column 54 through which the shaft 22 extends. The plate 50 is adjusted to provide a correct setting for the die with respect to lead variations and it is adapted to be clamped in position by clamping devices 56.

Figure 4:
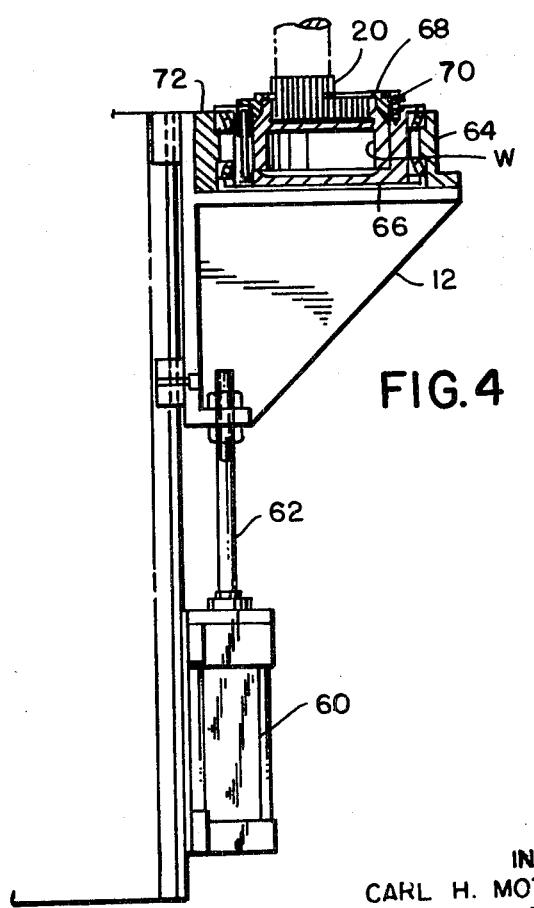
FIG. 4 is an elevational view of the work holding and elevating mechanism.

Referring now to FIG. 4 the platform 12 is connected to a piston located within a cylinder 60 by a piston rod 62 which shifts the platform 12 vertically between upper operating position and a lower loading and unloading position. The platform 12 carries a fixture 64 adapted to support a work gear here designated W in a cup-shaped work holding shell 66. The work gear is manually placed within the shell while the platform 12 is in the lower position and a clamp ring 68 is placed over the workpiece and clamped down by operating clamp screws 70. The shell 66 is rotatable in the fixture 64 by means of bearings indicated at 72.

It will be apparent in FIG. 4 that when the platform 12 is elevated the die 20 is received within the toothed portion of the work gear W.

Figure 2:
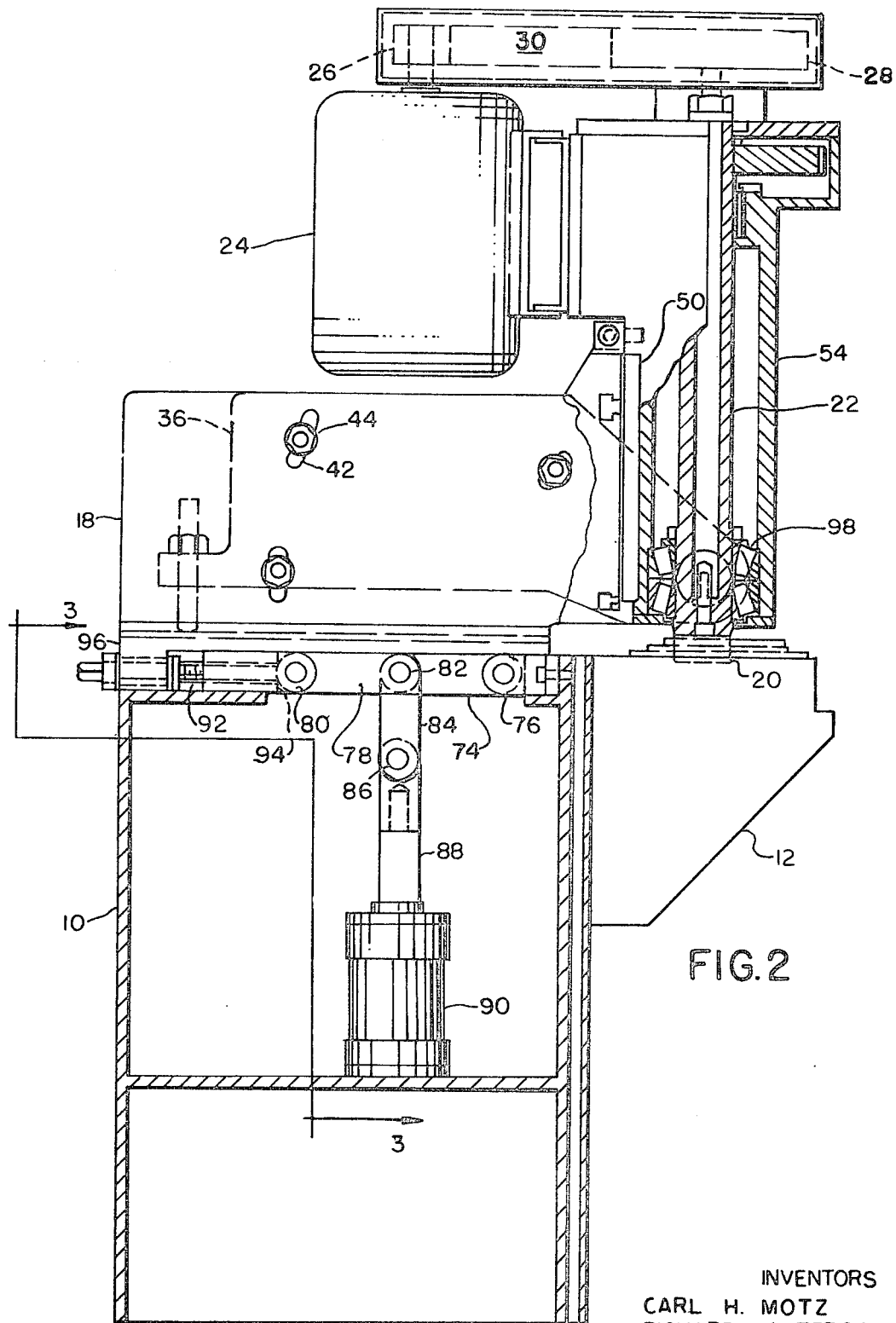
FIG. 2 is a side elevation of the machine with parts in section.
Figure 3:
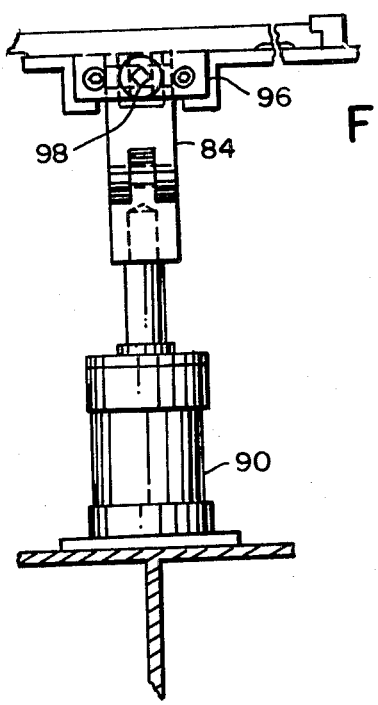
FIG. 3 is a fragmentary elevational view of the toggle actuating mechanism, as seen on the line 3—3, FIG. 2.

Referring now to FIGS. 2 and 3 the mechanism for applying rolling pressure between the teeth of the die and gear is illustrated. As seen in these Figures the slide 18 which is movable longitudinally of the ways 16 in a direction radial of the workpiece W, has a toggle linkage connected thereto comprising a first link 74 which is pivoted to a fixed pivot 76 provided on the base, and a second link 78 pivoted to a pivot 80 carried by the slide 18. The links 74 and 78 are interconnected by a pivot 82 to which is also connected a link 84 pivoted as indicated at 86 to the piston rod 88 of a piston movable vertically in the actuating cylinder 90. The pivot 80 is adjustable horizontally on the slide 18 by an adjustment screw 92 which is threaded in an opening in a depending lug 94. The screw is retained against axial movement relative to the slide 18 by a depending lug 96 and the outer end of the screw 92 is squared as indicated at 98 in FIG. 3.

It will be observed that the column 54 is connected at its lower end to the plate 50 and hence is solidly connected to the block 36. The lower end of the tubular drive shaft 22 is connected by heavy bearings indicated generally at 98 to permit the application of relatively great forces between the teeth of the die 20 and the teeth of the work gear W.

In operation the work gear is located in the fixture 64 when the fixture is lowered and the fixture is then elevated into a position in which the die 20 is received within its toothed portion. Thereafter, the toggle mechanism is actuated by the power cylinder 90 moving the slide 18 and the die supporting structure carried thereby to the left as seen in FIGS. 2 and 4, thus applying substantial pressure to the teeth of the work gear. At the same time the die 20 is driven in rotation so that the material at the teeth of the work gear is displaced into the required form.

Figure 5A:
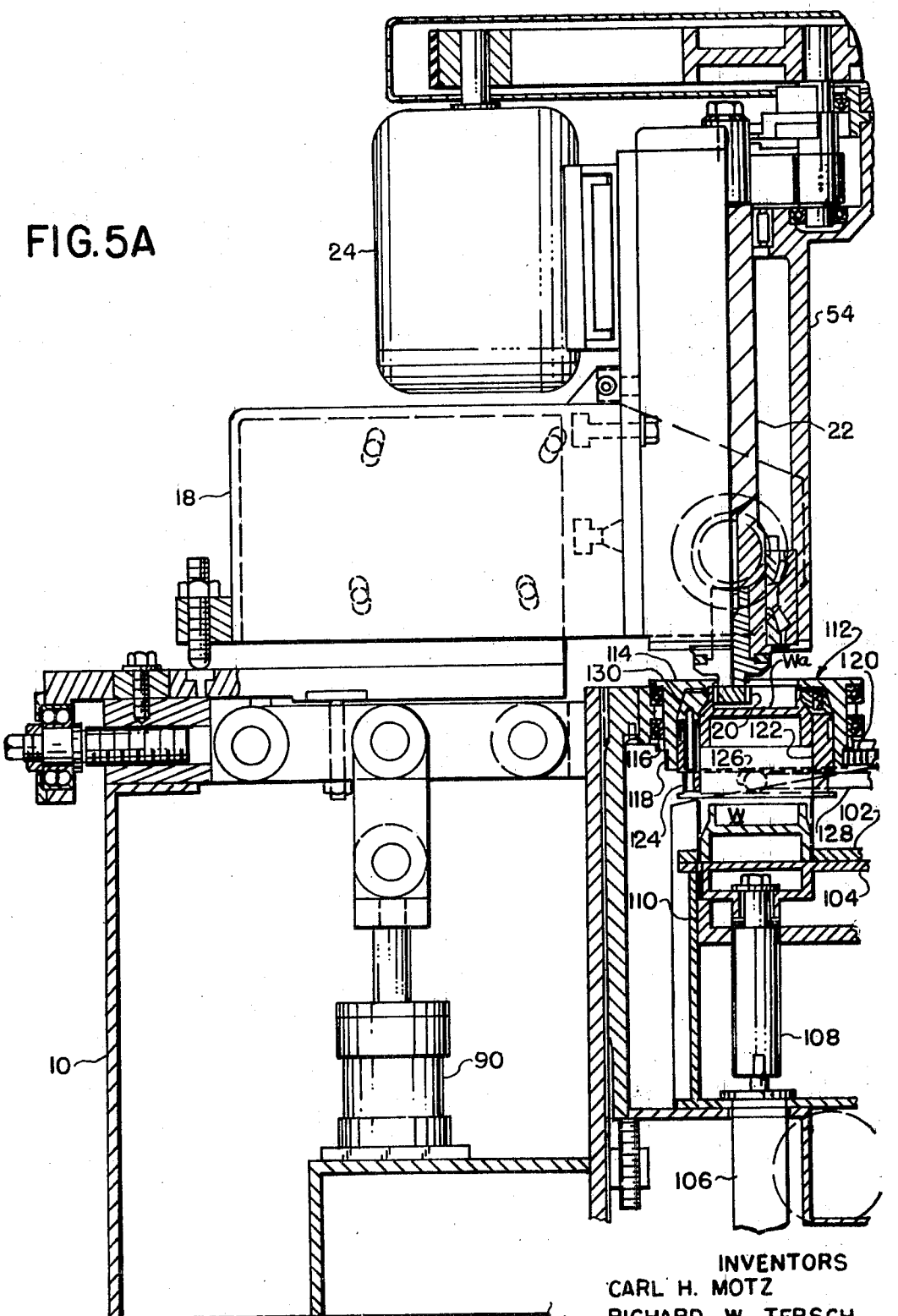
FIGS. 5A and 5B together constitute a side elevational view, partly in section, of a modified machine.
Figure 5B:
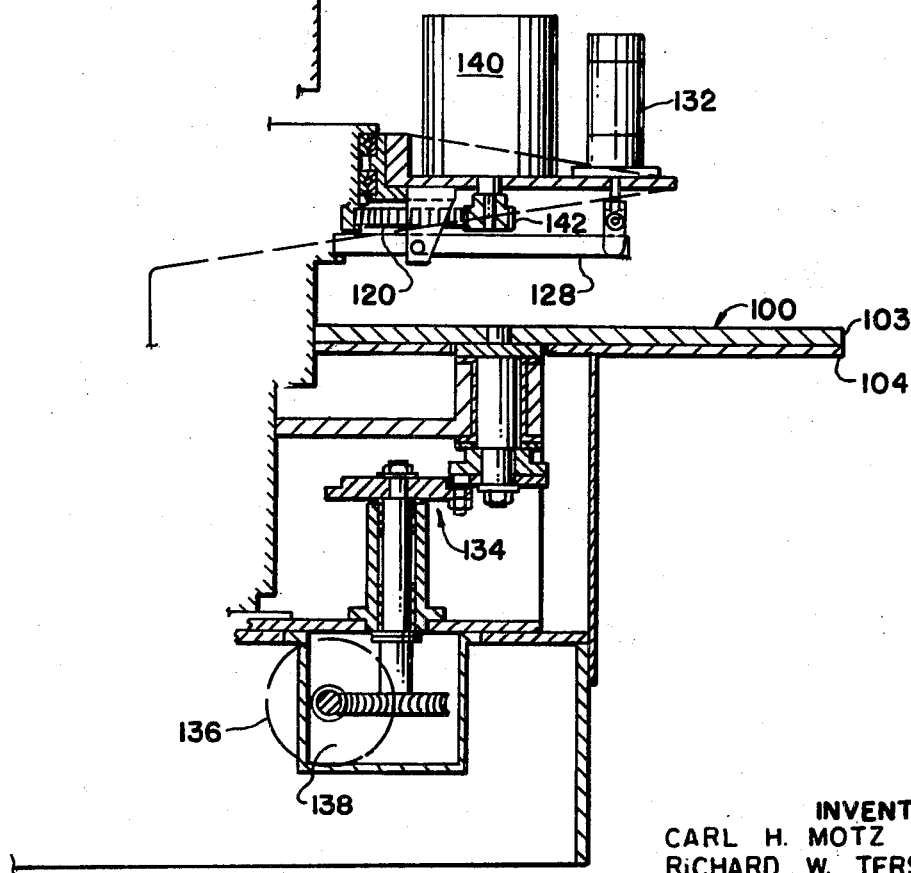

Referring now to FIGS. 5A and 5B there is illustrated a similar construction which differs from the previous embodiment of the invention essentially in the automatic loading equipment which is incorporated in the machine. Accordingly, the description of these Figures will be limited to this modified construction, the same reference characters being applied to parts of the machine which are identical with those illustrated and described in FIGS. 1-4.

A rotatable table 100 is provided formed of an upper plate 102 and a lower plate 104. As best seen in FIG. 5A the plates 102 and 104 have registering openings adapted to receive the workpiece W. The opening in the lower plate 104 is slightly smaller than the opening in the upper plate 102 and the parts are so dimensioned that the work piece rests within the opening in the upper plate against the peripheral margin of the opening in the lower plate.

Mounted on the machine is an elevating cylinder 106 the piston of which is connected by a slide 108 to an elevating cup 110 which is dimensioned to pass through an opening in the lower plate 104 so as to engage the lower edge of the workpiece W and elevate it into working position.

Fixedly mounted at the front of the machine is rotatable work support structure indicated generally at 112 and comprising a rotatable ring 114 mounted in bearings 116 and including a gear or sprocket portion 118 which is driven by a timing belt 120, later to be described.

A vertically movable sleeve 122 has a peripheral groove 124 which receives pins 126 on the end of a lever arm 128. An expanding collet 130 having an outer conical camming surface as illustrated is provided above the sleeve 122. When a work piece W on the elevator cup 110 is raised to position the work piece W in the position illustrated in FIG. 5A, the collet is cammed inwardly into gripping relation with the work piece and holds it securely in proper centered position during the rolling operation.

In FIG. 5A a workpiece W is illustrated in the lowered position ready to be engaged by the elevating cup 110, and a second workpiece Wa is illustrated in position in the collet 130. In practice, a workpiece is elevated by the cup 110 from the position illustrated at W to the position illustrated at Wa and is retained in this uppermost position by closing in of the collet 130 as a result of upward movement of the sleeve 122 by the lever 128 which is operated from a power cylinder 132.

However, while the workpiece is retained in the position Wa at this time, the cup 110 remains in elevated position until the workpiece is released from the collet by slight downward movement of the sleeve 122. At this time the cup 110 moves downwardly depositing the finished workpiece in the opening in the index table 100. The table is then indexed by suitable indexing means which for example may include a Geneva indexing device indicated generally at 134 in FIG. 5B operated from a motor 136 through a worm and worm wheel indicated at 138.

Means are provided for imparting preliminary rotation to the work gear W and this means comprises a motor 140 carrying a pinion 142 which drives the gear 118 through timing belt 120 previously referred to. The gear 118 drives the ring 114 and hence the work gear W.

The speed of rotation imparted to the gear W by the prerotation motor 140 is slightly different from the speed of rotation imparted to the die 20 by the motor 24. Accordingly, if initial movement of the die radially outwardly toward engagement with the teeth of the work gear fails to being about a meshing condition, the differential speed between the die and work gear causes the interference between the teeth to disappear and to hence bring about meshing engagement. The motor 140 is a nonpositive motor so that the speed of rotation of the work gear will be determined solely by the speed of rotation of the die 20 during the gear rolling operation. For this purpose the motor may be a suitable fluid motor although it may be electric.

With this construction it is only necessary for the operator to provide unfinished work gears on the table 100 and to remove finished workpieces therefrom while the table is at rest between intervening index operations.

What we claim as our invention is:

1. A gear rolling machine for internal gears comprising
   a frame,
   a die slide on said frame,
   a rotary die support on said slide for a gearlike die,
   a motor on said slide connected to said die support to drive said support in rotation,
   first motive means connected between said frame and slide to move said slide perpendicular to the axis of said rotary die support,
   a rotary work support on said frame,
   means for effecting relative movement between said work support and rotary die support in a direction parallel to the axis of said die support.

2. A gear rolling machine as defined in claim 1 in which said first motive means comprises a toggle connection.

3. A machine as defined in claim 1 comprising a drive shaft connected to said motor, said die support being at one end of said shaft.

4. A machine as defined in claim 1 in which the means for relatively moving said supports comprises a work slide on said frame, and second motive means connected between said frame and work slide.

5. A machine as defined in claim 1, the means connecting said rotary die support to said die slide comprising a block on said die slide angularly adjustable about an axis perpendicular to and intersecting the axis of said die and perpendicular to and spaced from the axis of said gear support.

6. A machine as defined in claim 5, the means connecting said rotary die support to said die slide comprising a plate carrying said die support and motor connected to said block for angular adjustment about an axis perpendicular to and intersecting the axes of both said rotary supports substantially at the zone of mesh between a die and gear carried thereby.

7. A machine for rolling the teeth of an internal gear comprising a frame, a die slide movable horizontally thereon, a substantially vertical die spindle having die support means at its lower end for supporting a gearlike die, a rotary gear support mounted on said frame in fixed position surrounding a die on said die support means, a clamping collet in said gear support, a work elevator below said collet, means for raising said elevator to position a work gear within said collet, and cam means for contracting said collet onto said work gear.

8. A machine as defined in claim 7 comprising a table indexable about a vertical axis, openings in said table in which work gears are receivable, said elevator being dimensioned to pass through said openings to raise a work gear into said collet and to remain in raised position during a gear rolling cycle and adapted to receive a finished gear and to move downwardly to deposit said finished gear in the opening in said table from which it was raised.

9. A machine as defined in claim 8 in which said collet has an outer conical surface, said cam means comprising a similar conical surface on said rotary support, an actuating ring engageable with said collet, and lever means operable when a work gear is within said collet to move said collet axially within said conical surface in said rotary support.

10. A machine as defined in claim 8, a prerotation motor connected to said work support to rotate said work support at a speed slightly different from that required by die rotation, said prerotation motor being a nonpositive operation such that when the die engages the work gear the rotation of the work gear is determined solely by its meshed engagement with the rotating die.

* * * * *